US007691289B2

(12) United States Patent
Okun et al.

(10) Patent No.: US 7,691,289 B2
(45) Date of Patent: Apr. 6, 2010

(54) COMPOSITIONS, MATERIALS INCORPORATING THE COMPOSITIONS, AND METHODS OF USING THE COMPOSITIONS, AND METHODS OF USING THE COMPOSITIONS AND MATERIALS

(75) Inventors: Nelya Okun, Alpharetta, GA (US); Craig L. Hill, Atlanta, GA (US)

(73) Assignee: Emory University, Atlanta, GA (US)

( * ) Notice: Subject to any disclaimer, the term of this patent is extended or adjusted under 35 U.S.C. 154(b) by 1375 days.

(21) Appl. No.: 10/786,671

(22) Filed: Feb. 25, 2004

(65) Prior Publication Data

US 2004/0230086 A1 Nov. 18, 2004

Related U.S. Application Data

(60) Provisional application No. 60/449,892, filed on Feb. 25, 2003.

(51) Int. Cl.
*C09K 3/00* (2006.01)
*A62D 3/00* (2007.01)
*A62D 2/38* (2007.01)

(52) U.S. Cl. ............................ 252/183.14; 252/183.11; 588/299; 588/320; 588/401; 588/405; 588/406; 588/408; 588/409; 588/901

(58) Field of Classification Search ................. 423/601, 423/604, 617, 660, 662, 673; 588/299, 320, 588/401, 405–409, 901, 400; 252/183.14, 252/183.11

See application file for complete search history.

(56) References Cited

U.S. PATENT DOCUMENTS

| | | | | |
|---|---|---|---|---|
| 3,387,916 | A | 6/1968 | Clarke | |
| 3,504,997 | A | 4/1970 | Clapham | |
| 3,925,006 | A | 12/1975 | Forschirm et al. | |
| 3,947,332 | A | 3/1976 | Vanderpool et al. | |
| 4,186,243 | A | 1/1980 | Astbury et al. | |
| 4,444,592 | A | 4/1984 | Ludwig | |
| 4,639,432 | A | 1/1987 | Holt et al. | |
| 4,714,482 | A | 12/1987 | Polak et al. | |
| 4,870,010 | A | 9/1989 | Hayes | |
| 5,053,084 | A | 10/1991 | Masumoto et al. | 148/11.5 |
| 5,071,877 | A | 12/1991 | Bannard et al. | |
| 5,093,134 | A | 3/1992 | Murrer et al. | 424/617 |
| 5,292,558 | A | 3/1994 | Heller et al. | |
| 5,314,657 | A | 5/1994 | Ostlund | 419/15 |
| 5,356,469 | A | 10/1994 | Jenkins et al. | |
| 5,391,638 | A | 2/1995 | Katsoulis et al. | 525/389 |
| 5,541,017 | A | 7/1996 | Hong et al. | 429/59 |
| 5,548,052 | A | 8/1996 | Katsoulis et al. | 528/10 |
| 5,603,927 | A | 2/1997 | Fukumoto et al. | |
| 5,607,979 | A | 3/1997 | McCreery | 514/759 |
| 5,824,706 | A | 10/1998 | Schinazi et al. | 514/492 |
| 5,851,948 | A | 12/1998 | Chuang et al. | |
| 5,885,992 | A | 3/1999 | Ohgi et al. | 514/245 |
| 5,908,647 | A | 6/1999 | Golightly et al. | |
| 5,914,436 | A | 6/1999 | Klabunde et al. | 588/205 |
| 5,928,382 | A | 7/1999 | Reinhardt et al. | |
| 5,990,373 | A | 11/1999 | Klabunde | 588/200 |
| 5,997,911 | A * | 12/1999 | Brinton et al. | 424/632 |
| 6,020,369 | A | 2/2000 | Schinazi et al. | 514/492 |
| 6,057,488 | A | 5/2000 | Koper et al. | 588/200 |
| 6,224,885 | B1 | 5/2001 | Jenner et al. | 424/401 |
| 6,410,603 | B1 | 6/2002 | Hobson et al. | 514/749 |
| 6,414,039 | B1 | 7/2002 | Braue et al. | 514/759 |
| 6,420,434 | B1 * | 7/2002 | Braue et al. | 514/759 |
| 6,713,076 | B1 | 3/2004 | Hill et al. | 424/402 |
| 6,723,349 | B1 | 4/2004 | Hill et al. | 424/604 |
| 2003/0049330 | A1 | 3/2003 | Hill et al. | |
| 2003/0072811 | A1 | 4/2003 | Hill et al. | |
| 2003/0216256 | A1 | 11/2003 | Axtell et al. | 502/417 |
| 2003/0220195 | A1 | 11/2003 | Axtell et al. | 502/417 |
| 2004/0134577 | A1 * | 7/2004 | Matsumura et al. | 149/37 |

FOREIGN PATENT DOCUMENTS

WO WO 99/53131 * 6/1998

(Continued)

OTHER PUBLICATIONS

Nelya Okun et al., "Polyoxometalates on cationic silica Highly selective and efficient O2/air-based oxidation of 2-chloroethyl ethyl sulfide at ambient temperature" Jan. 2003, Journal of Molecular Catalysis A: Chemical, 197, 283-290.*

(Continued)

*Primary Examiner*—Timothy C. Vanoy
*Assistant Examiner*—James Fiorito
(74) *Attorney, Agent, or Firm*—Thomas, Kayden, Horstemeyer & Risley, LLP

(57) ABSTRACT

Compositions, materials incorporating the compositions, and methods of use thereof, are disclosed. In one embodiment, the composition includes a metal nitrate selected from d-block metal nitrates and f-block metal nitrates and a metal salt having weakly bound counter anions. The metal of the metal salt having weakly bound counter anions is selected from a d-block metal and an f-block metal. Another embodiment of the composition includes a first polyoxometalate having a first metal selected from a d-block metal and an f-block metal and a second polyoxometalate having a second metal selected from a d-block metal and an f-block metal. The first metal being an open coordinate site of the first polyoxometalate. In addition, the first metal has a nitrate terminal ligand. The second metal being an open coordinate site of the second polyoxometalate. In addition, the second metal has a halide terminal ligand.

28 Claims, No Drawings

FOREIGN PATENT DOCUMENTS

WO WO 03/094977 * 11/2003

OTHER PUBLICATIONS

U.S. Appl. No. 10/767,578, filed Jan. 29, 2004, Hill, et al.
U.S. Appl. No. 10/767,689, filed Jan. 29, 2004, Hill, et al.
Chemical Abstracts 131:234039 (1999).
Chemical Abstracts 128:27274 (1997).
Holleman, et al., "Lahrbuch der Anorganischen Chemie", Walter de Gruyter, pp. 1097-1099, 1105-1106 (1985). German.
Gall, et al., "Selective Oxidation of Thioether Mustard (HD) Analogs by *tert*-Butylhydroperoxide Catalyzed by $H_5PV_2Mo_{10}O_{40}$ Supported on Porous Carbon Materials", Journal of Catalysis 159, 473-478 (1996).
Gall, et al., "Role of Water in Polyoxometalate-Catalyzed Oxidations in Nonaqueous Media. Scope, Kinetics, and Mechanism of Oxidation of Thioether Mustard (HD) Analogs by *tert*-Butyl Hydroperoxide Catalyzed by $H_5PV_2Mo_{10}O_{40}$", Inorg. Chem. 1994, 33, pp. 5015-5021, 1994.
Hulea, et al., "Thioether Oxidation by Hydrogen Peroxide Using Titanium-Containing Zeolites As Catalysts", Journal of Molecular Caralysis A: Chemical 111, 325-332 (1996).
Walmsley, "Synthesis of A Heteropolytungstate and Its Use in Outer-Sphere Redox Kinetics", Journal of Chemical Education, vol. 69, No. 11, 936-938 (1992).
Harrup, et al., "Polyoxometalate Catalysis of the Aerobic Oxidation of Hydrogen Sulfide to Sulfur", Inorg. Chem., 33, 5448-5455 (1994).
Hill, et al., "The First Combinatorially Prepared and Evaluated Inorganic Catalysts. Polymetates For The Aerobic Oxidation of the Mustard Analog Tetrahydrothiophene (THT)", Journal of Molecular Catalysis A: Chemical 114, pp. 103-111, (1996).
Riley, et al., "Selective Molecular Oxygen Oxidation of Thioethers to Sulfoxides Catalyzed by Ce(IV)", Journal American Chemical Society, 110, pp. 177-180 (1988).
Zeng, et al., "Catalytically Decontaminating Dendrimers. Poly-Tris Arborols Covalently Functionalized with Redox Active Polyoxomeatalates", Proc. Erdec Sci. Conf. Chem. Biol. Def. Res., pp. 351-357, Nov. 1997.
Johnson, et al., "CW-Agent Detecting Barrier Creams" Emory Department of Chemistry, Proc. Erdec Sci. Conf. Chem. Biol. Def. Res. pp. 393-399, Nov. 1997.
Rhule, et al., "New Polyoxometalate-TSPS for CW Agent Detection and Decontamination", Proc. Erdec Sci. Conf. Chem. Biol. Def. Res. pp. 307-313, Nov. 1998.
Gall, et al., Carbon Powder and Fiber-Supported Polyoxometalate Catalytic Materials. Preparation, Characterization, and Catalytic Oxidation of Dialkyl Sulfides as Mustard (HD) Analogues), Chemistry of Materials, vol. 8, No. 10, pp. 2523-2527 (1996).
Katsoulis, "A Survey of Applications of Polyoxometalates", Chem Rev., 98, pp. 359-387 (1998).
Hill, et al., Carbon Powder and Fiber-Supported Polyoxometalate Catalytic Materials. Preparation, Characterization, and Catalytic Oxidation of Dialkyl Sulfides Mustard (HD) Analogues), Chemistry of Materials, vol. 8, No. 10, pp. 2523-2527 (1996).
Riedel, "Light-Fastness of Pigments in Standard Color Depths," *Farbe Lack*, 74(4), no date.

* cited by examiner

COMPOSITIONS, MATERIALS INCORPORATING THE COMPOSITIONS, AND METHODS OF USING THE COMPOSITIONS, AND METHODS OF USING THE COMPOSITIONS AND MATERIALS

CROSS-REFERENCE TO RELATED APPLICATION

This application claims priority to copending U.S. provisional patent application entitled "Materials for Degrading Contaminants" filed on Feb. 25, 2003 and accorded Ser. No. 60/449,892, which is entirely incorporated herein by reference.

STATEMENT REGARDING FEDERALLY SPONSORED RESEARCH OR DEVELOPMENT

This invention was made with government support under Grant No.: DAMD 17-99-C-9012 awarded by the U.S. Army of the U.S. Government. The government has certain rights in the invention.

TECHNICAL FIELD

The present disclosure is generally related to compositions, materials incorporating the compositions, and methods of use thereof.

BACKGROUND

Decreasing the danger of contaminants, such as warfare agents, aldehydes, and sulfur compounds, has long been a significant issue. Compositions that can protect and/or remove contaminants from the environment in which people, such as military or office personnel, are operating can significantly decrease problems associated with contaminants. Various compositions have been used, but in many instances the compositions do not protect and/or remove contaminants in an efficacious manner. Thus, a heretofore unaddressed need exists in the industry to develop materials that are effective against contaminants.

SUMMARY

Briefly described, embodiments of this disclosure, among others, include compositions, materials incorporating the compositions, and methods of use thereof. In one embodiment, the composition includes a metal nitrate selected from d-block metal nitrates or f-block metal nitrates and a metal salt having weakly bound counter anions. The metal of the metal salt having weakly bound counter anions is selected from a d-block metal and an f-block metal.

Another embodiment of the composition includes a first polyoxometalate having a first metal selected from a d-block metal or an f-block metal and a second polyoxometalate having a second metal selected from a d-block metal and an f-block metal. The first metal being an open coordinate site of the first polyoxometalate. In addition, the first metal has a nitrate terminal ligand. The second metal being an open coordinate site of the second polyoxometalate. In addition, the second metal has a halide terminal ligand.

DETAILED DESCRIPTION

In accordance with the present disclosure, as embodied and broadly described herein, embodiments of this disclosure, in one aspect, relate to compositions, materials incorporating the compositions, and methods of use thereof, for the protection and/or decontamination of contaminants. An embodiment of the composition includes, but is not limited to, a metal nitrate and a metal salt having weakly bound counter anions. The metal nitrate can include, but is not limited to, d-block metal nitrates and f-block metal nitrates. The metal of the metal salt having weakly bound counter anions can include, but is not limited to, d-block metal salts and f-block metal salts. In addition, the composition can include a polyoxometalate. The composition is a mixture of two or more components (e.g., a metal salt having weakly bound counter anions, a metal nitrate, and/or a polyoxometalate). Additional details regarding embodiments of this composition are discussed below.

Another embodiment of the composition includes, but is not limited to, polyoxometalates having a metal such as a d-block metal and/or an f-block metal. The metal is an open coordinate site of the polyoxometalate and has a nitrate terminal ligand and/or a halide terminal ligand. The composition is a mixture of two or more polyoxometalates, where at least one of the polyoxometalates includes the nitrate terminal ligand and at least one of the polyoxometalates includes the halide terminal ligand. Additional details regarding embodiments of this composition are discussed below.

As described above, the metal nitrate can include, but is not limited to, d-block metal nitrates and f-block metal nitrates. In particular, embodiments of the composition can include metal nitrates such as, but not limited to, iron (III) nitrate, cobalt (II) nitrate, nickel (II) nitrate, copper (II) nitrate, cerium (III) nitrate, and cerium (IV) nitrate. In another embodiment the d-block or f-block metal can be replaced with an ammonium compound such as, but not limited to, tetraethylammonium (TEA) or tetra-n-butylammonium (TBA), for example.

As described above, the metal salt having weakly bound counter anions can include, but is not limited to, d-block metal salts having weakly bound counter anions and f-block metal salts having weakly bound counter anions. The d-block metal salts and f-block metal salts can include any known weakly bound anion or large hydrophobic "low-charge" counterion. The anions can include, but are not limited to, perchlorate, trifluoromethanesulfonate (commonly know as "triflate"), and tetrafluoroborate. The d-block metal and f-block metal can include, but is not limited to, copper and iron. In particular, embodiments of the composition can include metal salts having weakly bound counter anions, such as, but not limited to, copper (II) perchlorate, copper (II) trifluoromethanesulfonate, and copper (II) tetrafluoroborate.

The composition can include the metal nitrate in about 15 to 40% weight of the composition and about 20 to 30% weight of the composition. In addition, the composition can include the metal having weakly bound counter anions in about 60 to 85% weight of the composition and about 70 to 80% weight of the composition.

Another embodiment of the composition can include a polyoxometalate as well as the metal nitrate and the metal salt having weakly bound counter anions. The polyoxometalate can have the general formula of $A[V_kMo_mW_nNb_oTa_pM_qX_rO_s]^{y-}$. "A" is at least one counterion, which can include, but is not limited to, alkali metal cations, alkaline earth metal cations, ammonium cations, quaternary ammonium cations, d-block cations, f-block cations, or combinations thereof "M" is at least one f- or d-block element having at least one d-electron, except for vanadium, molybdenum, tungsten, niobium, or tantalum. "X" is at least one p-, d-, or f-block element, except for oxygen. In addition, "k" can range from 0 to 30, "m" can range from 0 to 160, "n" can range from 0 to 160, "o" can range from 0 to 30, "p" can range from 0 to 10, "q" can range from 0 to 30, "r" can range from 0 to 30, "s" is sufficiently large that "y" is greater than zero. Further, the sum of"k", "m", "n", "o", and "p" is greater than or equal to four; and the sum of "k", "m", and "q" is greater than zero.

In another embodiment, the polyoxometalate has the formula $[X^{g+}V_bM^{h+}{}_cZ_{12\text{-}b\text{-}c}O_{40}]^{u-}[A]$. "X" is at least one p-, d-, or f-block element, while "g+" is the charge of X. "M" is at least one f-block element or d-block element having at least one d-electron, where "M" is not vanadium and "h+" is the charge of "M". "Z" is tungsten, molybdenum, niobium, or a combination thereof In addition, "b" is from 0 to 6; "c" is from 0 to 6, where the sum of"b" and "c" is greater than or equal to one. Lastly, "u" is greater than 3 and "A" is a counterion.

In another embodiment, the polyoxometalate has the formula $[X^{g+}V_bZ_{12\text{-}b}O_{40}]^{u-}[A]$. "X" is at least one of phosphorus, silicon, aluminum, boron, zinc, cobalt, or iron, while "Z" includes tungsten, molybdenum, niobium, or a combination thereof. In addition, "b" is from 1 to 6 and "u" is greater than 3.

In another embodiment, the polyoxometalate has the formula $[X^{g+}M^{h+}{}_cZ_{12\text{-}c}O_{40}]^{u-}[A]$. "X" is at least one of phosphorus, silicon, aluminum, boron, zinc, cobalt, or iron, while "Z" includes tungsten, molybdenum, niobium, or a combination thereof. In addition, "$M^{h+}$" is at least one f-block element or d-block element having at least one d-electron, while "c" is from 1 to 6 and "u" is greater than 3.

In another embodiment, the polyoxometalate has the formula $[X^{i+}{}_2V_uM^{j+}{}_vZ_{18\text{-}u\text{-}v}O_{62}]^{w-}[A]$. "X" is at least one p-, d-, or f-block element, "i+" is the charge of "X". "M" is at least one d- or f-block element, where "M" is not vanadium. In addition, "j+" is the charge of "M". "Z" is tungsten, molybdenum, niobium, or a combination thereof. Further, "u" is from 0 to 9; "v" is from 0 to 9, where the sum of "u" and "v" is greater than or equal to one. Lastly, "w" is greater than or equal to 4 and "A" is a counterion.

In another embodiment, the polyoxometalate has the formula $[X^{i+}{}_2V_uZ_{18\text{-}u}O_{62}]^{w-}[A]$. "X" is at least one of phosphorus, sulfur, silicon, aluminum, boron, zinc, cobalt, or iron. "Z" comprises tungsten, molybdenum, niobium, or a combination thereof In addition, "u" is from 1 to 9 and "w" is greater than or equal to 4.

In another embodiment, the polyoxometalate has the formula $[X^{i+}{}_2M^{j+}{}_vZ_{18\text{-}v}O_{62}]^{w-}[A]$. "X" is at least one of phosphorus, sulfur, silicon, aluminum, boron, zinc, cobalt, or iron. "Z" comprises tungsten, molybdenum, niobium, or a combination thereof "$M^{j+}$" is at least one d- or f-block element, while "v" is from 1 to 9 and "w" is greater than or equal to 4.

In another embodiment, the polyoxometalate has the formula $[YV_xZ_{12\text{-}x}O_{40}][A]$. "Y" is phosphorus, silicon, or aluminum, while "Z" is tungsten or molybdenum. In addition, "x" is from 1 to 6 and "A" is a counterion. In one embodiment, "Y" is phosphorus and "Z" is molybdenum. In one embodiment, "Y" is phosphorus and "Z" is tungsten. In one embodiment, "Y" is silicon and "Z" is molybdenum. In one embodiment, "Y" is silicon and "Z" is tungsten. In one embodiment, "Y" is aluminum and "Z" is tungsten. In one embodiment, "Y" is aluminum and "Z" is molybdenum.

The composition can include the polyoxometalate in about 0.05 to 0.20% weight of the composition. In particular, the composition can include the polyoxometalate in about 0.10 to 0.15% weight of the composition.

Some compositions are effective at degrading contaminants such as warfare agents (e.g., chemical and/or biological warfare agents). Not intending to be bound by any particular theory, embodiments of the disclosure may be effective as catalysts with respect to the oxidation of chemical and/or biological warfare agents. In particular, compositions of the present disclosure are effective at oxidizing 2-chloroethyl ethyl sulfide (CEES), a mustard gas stimulant, using oxygen ($O_2$) or air as the terminal oxidant.

In this regard, Table 1 describes results obtained by allowing 2-chloroethyl ethyl sulfide (CEES) to be oxidized by dioxygen in air while in the presence of exemplary compositions.

TABLE 1

Selective Aerobic Sulfoxidation of 2-Chloroethyl Ethyl Sulfide (CEES) in Acetonitrile by Cu(II) and/or Polyoxometalate (POM)-based Homogeneous Catalysts[a]

| Catalyst[b] | POM (mmol)[c] | % conv.[d] | % yield[e] | TON[g] |
|---|---|---|---|---|
| $Cu(NO_3)_2/Cu(OTf)_2$ (Cu/Cu)[h] | 0 | 56 | 56 | — |
| $TBA_6V_{10}O_{28}$ ($TBA_61$)[i] | 0.003 | 0 | 0 | 0 |
| $TBA_5PV_2Mo_{10}O_{40}$ ($TBA_52$)[i] | 0.0035 | 2.5 | 2.4 | 6 |
| $TBA_6Fe_3PW_9O_{37}$ ($TBA_63$)[i] | 0.004 | 0 | 0 | 0 |
| $TBA_9Fe_3(A\text{-}PW_9O_{34})_2$ ($TBA_94$)[i] | 0.004 | 0 | 0 | 0 |
| $TBA_{12}Fe(OH_2)_2Fe_2(P_2W_{15}O_{56})_2$ ($TBA_{12}5$)[i] | 0.002 | 0 | 0 | 0 |
| Cu/Cu/$TBA_61$ | 0.003 | 56 | 56 | 0 |
| Cu/Cu/$TBA_52$ | 0.0035 | 56 | 56 | 0 |
| Cu/Cu/$TBA_63$ | 0.004 | 81 | 81 | 54 |
| Cu/Cu/$TBA_94$ | 0.002 | 57 | 57 | 0 |
| Cu/Cu/$TBA_{12}5$ | 0.0022 | 56 | 56 | 0 |

[a]General conditions: 0.875 mmol (0.35 M) of CEES, catalyst (quantity given in column 2 or in footnote h for Cu(II) only reaction on first line), 1 atm of air, 0.876 mmol (0.35 M) of 1,3-dichlorobenzene (internal standard) were stirred in 2.5 mL of acetonitrile at 25° C. for 20 h;
[b]no product was observed in the absence of POM, ($Si/AlO_2$) or POM/($Si/AlO_2$);
[c]mmol of total POM present in the catalyst during turnover;
[d]% conversion = (moles of CEES consumed/moles of initial CEES) × 100;
[e]% yield = (moles of CEESO/moles of initial CEES) × 100;
[f]turnover frequency = turnovers/reaction time;
[g]turnovers = moles of CEESO formed due to addition of POM to Cu/Cu/moles of POM, calculated as $\{C_{CEES} \times [(\text{yield} - 56)/100]\}/C_{POM}$;
[h](Cu/Cu) = 15 mM $Cu(NO_3)_2$ + 22.5 mM $Cu(OTf)_2$ (94 mmol of total Cu);
[i]1 = $V_{10}O_{28}{}^{6-}$, 2 = $PV_2Mo_{10}O_{40}{}^{5-}$, 3 = $Fe_3PW_9O_{37}{}^{6-}$, 4 = $[(Fe^{III}(OH_2)_2)_3(A\text{-}\alpha\text{-}PW_9O_{34})_2]^{9-}$, 5 = $[Fe(OH_2)_2Fe_2(P_2W_{15}O_{56})_2]^{12-}$.

In another embodiment described above, the composition includes, but is not limited to, two or more polyoxometalates having a metal such as a d-block metal and/or an f-block metal. As described above, the metal is an open coordinate site of the polyoxometalate and has a nitrate terminal ligand and/or a halide terminal ligand. The composition is a mixture of at least a first polyoxometalate having a nitrate terminal ligand and a second polyoxometalate having a halide terminal ligand.

The first polyoxometalate includes a first metal that is an open coordinate site of the first polyoxometalate and has a nitrate terminal ligand. The first metal can include a d-block metal and/or an f-block metal such as, but not limited to, iron (III), cobalt (II), nickel (II), copper (II), cerium (III), and cerium (IV). In particular, the first metal can include iron (III), copper (II), cerium (III), and cerium (IV).

The second polyoxometalate includes a second metal that is an open coordinate site of the second polyoxometalate and has a halide terminal ligand. The second metal can include a d-block metal and/or an f-block metal such as, but not limited to, iron (III) and copper (II). The halide can include bromide, chloride, fluoride, and iodide, and preferably bromide.

In addition to the first metal and the second metal, the first and/or second polyoxometalates, respectively, can be further described by the formulas $A[V_kMo_mW_nNb_oTa_pM_qX_rO_s]^{y-}$, $[X^{g+}V_bM^{h+}{}_cZ_{12\text{-}b\text{-}c}O_{40}]^{u-}[A]$, $[X^{g+}V_bZ_{12\text{-}b}O_{40}]^{u-}[A]$, $[X^{g+}M^{h+}{}_cZ_{12\text{-}c}O_{40}]^{u-}[A]$, $[X^{i+}{}_2V_uM^{j+}{}_vZ_{18\text{-}u\text{-}v}O_{62}]^{w-}[A]$, $[X^{i+}{}_2V_uZ_{18-u}O_{62}]^{w-}[A]$, $[X^{i+}{}_2M^{j+}{}_vZ_{18-v}O_{62}]^{w-}[A]$, and $[YV_xZ_{12-x}O_{40}][A]$, as defined in more detail above.

In particular, the first polyoxometalate can include $TBA_{9-x}H_x[A\text{-}\alpha\text{-}(Fe(NO_3))_3PW_9O_{37}]$, $TBA_{12-x}H_x[A\text{-}\alpha\text{-}(Cu(NO_3))_3PW_9O_{37}]$, $TBA_{9-x}H_x[A\text{-}\alpha\text{-}(Ce(III)(NO_3))_3PW_9O_{37}]$, and $TBA_{6-x}H_x[A\text{-}\alpha\text{-}(Ce(IV)(NO_3))_3PW_9O_{37}]$, for example. The second polyoxometalate can include $TBA_{9-n-x}Na_n[A\text{-}\alpha\text{-}(FeBr)_3PW_9Br_xO_{37-x}]$ and $TBA_{12-n-x}Na_n[A\text{-}\alpha\text{-}(CuBr)_3PW_9Br_xO_{37-x}]$, for example. In other embodiments the first and second polyoxometalates, one or more counterions such as sodium, potassium, lithium, or combinations thereof, can be used in place of one or more TBA cations or H cations.

The composition can include the first polyoxometalate in about 35 to 65% weight of the composition and the about 45 to 55% weight of the composition. In addition, the composition can include the second polyoxometalate in about 35 to 65% weight of the composition and about 45 to 55% weight of the composition.

In this regard, Table 2 describes results obtained by allowing 2-chloroethyl ethyl sulfide (CEES) to be oxidized by dioxygen in air while in the presence of exemplary compositions.

TABLE 2

Aerobic Oxidation of 2-Chloroethyl Ethyl Sulfide (CEES) in Acetonitrile by Keggin-type Polyoxometalates (POMs)-based Homogeneous Catalysts[a]

| | 30 min[c] | | 20 hrs[c] | | 50 hrs[c] | |
|---|---|---|---|---|---|---|
| Catalyst[b] | % conv.[d] | % yield[e] | % conv.[d] | % yield[e] | % conv.[d] | % yield[e] |
| $TBA_9(Fe^{III}(OH_2)_2)_3(A\text{-}\alpha\text{-}PW_9O_{34})_2$ (1) | 0 | 0 | 0 | 0 | 0 | 0 |
| $TBA_{9-n-x}Na_n[A\text{-}\alpha\text{-}(FeBr)_3PW_9Br_xO_{37-x}]$ (2)[f] | 0 | 0 | 0 | 0 | 0 | 0 |
| 1 + 2 | 0 | 0 | 0 | 0 | 0 | 0 |
| $TBA_{9-x}H_x[A\text{-}\alpha\text{-}(Fe(NO_3))_3PW_9O_{37}]$ (3)[g] | 1 | 0.5 | 3 | 3[h] | 12 | 12 |
| 3 + 2 | 4 | 2 | 57 | 48 | 66 | 60 |
| $TBA_{12-x}H_x[A\text{-}\alpha\text{-}(Cu(NO_3))_3PW_9O_{37}]$ (4)[i] | 1 | 1.5 | 5 | 5 | 12 | 12 |
| 4 + 2 | 37 | 30 | 70 | 63 | 99 | 90 |
| $TBA_{9-x}H_x[A\text{-}\alpha\text{-}(Ce(III)(NO_3))_3PW_9O_{37}]$ (5)[j] | 1 | 0.5 | 3 | 3 | 5 | 5 |
| 5 + 2 | 7 | 5 | 33 | 25 | 33 | 30 |
| $TBA_{6-x}H_x[A\text{-}\alpha\text{-}(Ce(IV)(NO_3))_3PW_9O_{37}]$ (6)[k] | 1 | 1 | 5 | 5 | 8 | 8 |
| 6 + 2 | 19 | 15 | 58 | 52 | 75 | 70 |

[a]General conditions: 0.875 mmol (0.35 M) of CEES, 1 atm of air, 0.876 mmol (0.35 M) of 1,3-dichlorobenzene (internal standard) and 0.005 mmol of metal nitrate-containing POM or its (1:0.75) mixture with ferric bromide-containing POM were stirred in 2.5 mL of acetonitrile at 25° C.; all POMs except (2) were stored at least 180 days prior to testing in a mixture with (2);
[b]no product was observed in the absence of POM;
[c]reaction time;
[d]% conversion = (moles of CEES consumed/moles of initial CEES) × 100;
[e]% yield = (moles of CEESO/moles of initial CEES) × 100;
[f]Fe(III) bromide-containing POM;
[g]Fe(III) nitrate-containing POM;
[h]with freshly prepared wet POM the conversion is 55%;
[i]Cu(II) nitrate-containing POM;
[j]Ce(III) nitrate-containing POM;
[k]Ce(IV) nitrate-containing POM.

Embodiments of the compositions described herein are capable of degrading a single contaminant or multiple contaminants in an environment. The term "environment" as used herein refers to any media that contains at least one contaminant. For example, in one embodiment, the environment may comprise a liquid phase. In another embodiment, the environment may comprise a gas phase.

The term "degrade" or "degradation" refers to, but is not limited to, the degradation of the contaminant, the conversion of the contaminant into another compound that is either less toxic or nontoxic, or the adsorption of the contaminant by the compositions of the present disclosure. The compositions may be able to degrade the contaminant by a number of different mechanisms. For example, the compositions of the present disclosure can aerobically oxidize the contaminant.

Contaminants that can be degraded by using compositions of the present disclosure include, but are not limited to, chemical warfare agents, biological warfare agents, or combinations thereof. Exemplary chemical warfare agents include mustard gas and sarin, while an exemplary biological warfare agent includes anthrax.

Some of the chemical warfare agents and biological warfare agents disclosed in Marrs, Timothy C.; Maynard, Robert L.; Sidell, Frederick R.; *Chemical Warfare Agents Toxicology and Treatment;* John Wiley & Sons: Chichester, England, 1996; Compton, James A. F.; *Military Chemical and Biological Agents Chemical and Toxicological Properties;* The Telford Press: Caldwell, N.J., 1988; Somani, Satu M.; *Chemical Warfare Agents;* Academic Press: San Diego, 1992, which are incorporated herein by reference in their entirety, may be degraded by embodiments of the present disclosure.

Furthermore, contaminants that can be degraded by using embodiments of the present disclosure generally include, but are not limited to, the following: aldehydes, aliphatic nitrogen compounds, sulfur compounds, aliphatic oxygenated compounds, halogenated compounds, organophosphate compounds, phosphonothionate compounds, phosphorothionate compounds, arsenic compounds, chloroethyl compounds, phosgene, cyanic compounds, or combinations thereof. In one embodiment, the contaminant is acetaldehyde, methyl mercaptan, ammonia, hydrogen sulfide, diethyl sulfide, diethyl disulfide, dimethyl sulfide, dimethyl disulfide, trimethylamine, styrene, propionic acid, n-butyric acid, n-valeric acid, iso-valeric acid, pyridine, formaldehyde, 2-chloroethyl ethyl sulfide, carbon monoxide, or combinations thereof.

Compositions of the present disclosure are typically used in the presence of an oxidizer to degrade a contaminant from the environment. An example of an oxidizer includes, but is not limited to, dioxygen. In a preferred embodiment, oxygen present in the air is used as the oxidizer.

Compositions of the present disclosure can be incorporated into a suitable material in order to facilitate the protection and/or degradation of a contaminant. The materials may include, for example, topical carriers, coatings, powders, and/or fabrics, for example. A material as used herein refers to a media that incorporates one or more of the compositions of the present disclosure.

Some compositions can be incorporated into the material using techniques known in the art. In one embodiment, when the material is a topical carrier, powder, or coating, the composition is directly added to and admixed with the material. In one embodiment, the components of the composition can be incorporated sequentially into the material. In another embodiment, the material is contacted with a composition comprising the composition and a solvent. The composition can be soluble, partially soluble, or insoluble in the solvent, depending upon the components of the composition and the solvent selected. In one embodiment, the solvent is water. In another embodiment, the solvent can be an organic solvent. Examples of solvents useful in embodiments of the present disclosure include, but are not limited to, acetonitrile, toluene, carbon dioxide, xylenes, 1-methyl-2pyrrolidinone, or fluorinated media such as perfluoropolyether compounds.

The amount of each composition incorporated into the material varies, depending, at least in part, upon the contaminant to be degraded and the material that is selected. There is little restriction on the amount of each composition that can be incorporated into the material. In one embodiment, the composition incorporated in the material is from 0.1 to 95% by weight of the composition. In one embodiment, the lower limit of composition by weight maybe 0.05, 0.1, 0.5, 1.0, 2.0, 5.0, 10, 15, 20, 25, 30, 35, 40, 45, or 50%, and the upper limit maybe 30, 40, 50, 60, 70, 80, 90, or 95%. In one embodiment, when the material is a topical carrier, the composition is from 1 to 50% by weight of topical composition.

Compositions of the present disclosure can be used in a wide variety of topical carriers. Suitable topically acceptable pharmaceutical carriers are those which typically are used in the topical application of pharmaceuticals and cosmetics. Examples of such carriers include, but are not limited to, lotions, creams, ointments, and gels. In some applications, topical carriers can be referred to as barrier creams and topical skin protectants. Any of the topical carriers disclosed in U.S. Pat. No. 5,607,979, to McCreery, which is incorporated by reference in its entirety, can be used in some of the embodiments of the present disclosure. In one embodiment, the topical carrier comprises a perfluorinated media (e.g., a polymer or a mixture of polymers). In another embodiment, the topical carrier comprises perfluoropolyether compounds. An example of a perfluoropolyether (PFPE) compound useful in the present disclosure has the general formula $CF_3O[—CF(CF_3)CF_2O—]_x(—CF_2O—)_yCF_3$. Examples of PFPE media include Fluorolink®, Galden®, and Fomblin®, for example, from the Ausimont Montedison Group. In one embodiment, the topical carrier comprises a perflourinated polymer and one or more unfluorinated polymers or compounds. In another embodiment, the topical carrier comprises a perfluoropolyether and one or more unfluorinated polyethers.

In one embodiment, the topical carrier may further contain saturated or unsaturated fatty acids such as stearic acid, palmitic acid, oleic acid, palmito-oleic acid, cetyl or oleyl alcohols, stearic acid, fluorinated acids, fluorinated alcohols, or combinations thereof The cream may also optionally contain one or more surfactants, such as a non-ionic surfactant.

A wide variety of powders and coatings (e.g., thermoplastics and thermosettings) known in the art can be used as the material in embodiments of the present disclosure. In one embodiment, the powder comprises activated carbon.

Almost any fabric can be developed to include one or more of the compositions. In one embodiment, fabrics used to prepare garments, draperies, carpets, and upholstery can be used and articles made from them are a part of this disclosure. In another embodiment, the fabric can be a knit or non-woven fabric. Useful fibers include, but are not limited to, polyamide, cotton, polyacrylic, polyacrylonitrile, polyester, polyvinylidine, polyolefin, polyurethane, polyurea, polytetrafluoroethylene, or carbon cloth, or a combination thereof. In still another embodiment, the fabric is prepared from cotton, polyacrylic, or polyacrylonitrile. In still another embodiment, the fabric is prepared from a cationic fiber. In another embodiment, the fabric comprises (1) a 50/50 blend of nylon-6,6 and cotton or (2) stretchable carbon blended with polyurethane or polyurea.

Further, any cellulosic fiber can incorporate the mixtures of the present disclosure. Examples of useful cellulosic fibers include, but are not limited to, wood or paper.

In one embodiment, when the material is a fabric or cellulosic fiber, the composition is from about 0.1 to about 20% by weight composition and from initially about 80 to about 99.9% by weight water, preferably from about 0.3 to about 15% by weight composition and initially 85 to 99.7% by weight water. Generally, the fabric or cellulosic fiber is dipped or immersed into the composition from several hours up to days at a temperature of from about 0° C. to 100° C., preferably for 2 hours to 2 days at from about 25° C. to 80° C. In another embodiment, the composition can be admixed with a resin or adhesive, and the resultant adhesive is applied to the surface of, or admixed with, the fabric or cellulosic fiber.

Typically, once the material has been contacted with the composition, the composition is dried in order to remove residual solvent. In one embodiment, the composition is heated from about 0° C. to 220° C. at or below atmospheric pressure, preferably from about 25° C. to 100° C. In another embodiment, the composition is dried in vacuo (i.e., less than or equal to about 10 torr).

In another embodiment, when the material is a fabric or cellulosic fiber, the composition can be incorporated into the fabric or cellulosic fiber by depositing the composition on the surface of an existing fabric or cellulosic fiber, covalently bonding the components of the composition to the fibers of the fabric or cellulosic fiber, impregnating or intimately mixing the composition with the fabric or cellulosic fiber, electrostatically bonding the components of the composition to the fabric or cellulosic fiber, or datively bonding the components of the composition to the fabric or cellulosic fiber.

Embodiments of the compositions of the present disclosure have a number of advantages over the prior art decontaminants. One advantage is that the compositions of the present disclosure can catalytically degrade a contaminant from the environment starting within milliseconds of contact and can degrade the contaminant for extended periods of time, ranging from several days to indefinitely. Another advantage is that some compositions can render the material more water-resistant and increase the surface area of the material. Finally, when the material is a fabric or cellulosic fiber, the composition can enhance the dyeability, light fastness, color fastness, and weaving properties of the fabric or cellulosic fiber.

It should be emphasized that the above-described embodiments of the present disclosure, particularly, any "preferred" embodiments, are merely possible examples of implementations, and are merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the invention, at least the following is claimed:

1. A composition, comprising:

a metal nitrate selected from d-block metal nitrates and f-block metal nitrates, wherein the metal nitrate is selected from the group consisting of iron (III) nitrate, cobalt (II) nitrate, nickel (II) nitrate, cerium (III) nitrate and cerium (IV) nitrate; and a metal salt having weakly bound counter anions, wherein the metal is selected from the group consisting of a d-block metal and an f-block metal and the anion is selected from the group consisting of perchlorate, trifluoromethanesulfonate, and tetrafluoroborate; wherein the composition further comprises a polyoxometalate.

2. The composition of claim 1, wherein the metal salt having weakly bound counter anions is selected from the group consisting of copper (II) perchlorate, copper (II) trifluoromethanesulfonate, and copper (II) tetrafluoroborate.

3. The composition of claim 1, wherein the metal nitrate is selected from iron (III) nitrate, cobalt (II) nitrate, nickel (II) nitrate, cerium (III) nitrate and cerium (IV) nitrate, and wherein the metal salt having weakly bound counter anions is selected from the group consisting of copper (II) perchlorate, copper (II) trifluoromethanesulfonate, and copper (II) tetrafluoroborate.

4. The composition of claim 1, wherein the polyoxometalate has the formula $A[V_kMo_mW_nNb_oTa_pM_qX_rO_s]^{Y-}$, wherein A includes at least one counterion selected from the group consisting of alkali metal cations, alkaline earth metal cations, ammonium cations, quaternary ammonium cations, d-block cations, f-block cations, and combinations thereof, wherein M includes at least one element selected from the group consisting of an f-block element and a d-block element having at least one d-electron, except for vanadium, molybdenum, tungsten, niobium, or tantalum, wherein X includes at least on element selected from the group consisting of a p-block element, a d-block element, and an f-block element, except for oxygen, wherein k can range from 0 to 30, wherein m can range from 0 to 160, wherein n can range from 0 to 160, wherein o can range from 0 to 30, where p can range from 0 to 10, wherein q can range from 0 to 30, wherein r can range from 0 to 30, wherein s is a number so that y is greater than zero, wherein the sum of k, m, n, o, and p is greater than or equal to four; and wherein the sum of k, m, and q is greater than zero.

5. The composition of claim 1, wherein the polyoxometalate has the formula $[X^gV_b{}^{j+}M_c{}^{h+}Z_{12\text{-}b\text{-}c}{}^{l+}O_{x]}{}^{u-}[A]$,wherein X is at least one p-, d-, or f-block element; g is greater than or equal to 2; M is at least one f-block element or d-block element having at least one d-electron, wherein M is not vanadium; h is from 1 to 7; i is from 5 to 6; j is from 4 to 5; x is 39 or 40; Z is tungsten, molybdenum, niobium, or a combination thereof; b is from 0 to 6; c is from 0 to 6; u is from 3 to 9; and A is a counterion.

6. The composition of claim 5, wherein the polyoxometalate has the formula $[X^9V_b{}^{j+}Z_{12\text{-}b}{}^{i+}O_{40}]^{u-}[A]$, wherein X is at least one of phosphorus, silicon, aluminum, boron, zinc, cobalt, or iron; b is from 1 to6.

7. The composition of claim 5, wherein the polyoxometalate has the formula $[X^{g+}M_c{}^{h+}Z_{12\text{-}c}{}^{i+}O_{40}]^{u-}[A]$, wherein X is at least one of phosphorus, silicon, aluminum, boron, zinc, cobalt, or iron; c is from 1 to 6, and u is from 3to 9.

8. The composition of claim 1, wherein the polyoxometalate has the formula $[X_2{}^{r+}V_u{}^{s+}M_v{}^{t+}Z_{18\text{-}u\text{-}v}{}^{y+}O_{z]}{}^{w-}[A]$, wherein X is at least one p-, d-, or f-block element; r is greater than or equal to 1; M is at least one f-block element or d-block element having at least one d-electron, wherein M is not vanadium; t is from 1 to 7; s is from 4 to 5; Z is tungsten, molybdenum, niobium, or a combination thereof; u is from 0 to 9; v is from 0 to 9; y is from 5 to 6; z is 61 or 62; w is greater than or equal to 4; and A is a counterion.

9. The composition of claim 8, wherein the polyoxometalate has the formula $[X_2{}^{r+}V_u{}^{s+}Z_{18\text{-}u}{}^{y+}O_{62}]^{w-}[A]$,wherein X is at least one of phosphorus, sulfur, silicon, aluminum, boron, zinc, cobalt, or iron; u is from 1 to 9; and w is greater than or equal to 4.

10. The composition of claim 8, wherein the polyoxometalate has the formula $[X_2{}^{r+}M_v{}^{t+}Z_{18\text{-}v}{}^{y+}O_{62}]^{w-}[A]$, wherein X is at least one of phosphorus, sulfur, silicon, aluminum, boron, zinc, cobalt, or iron; v is from 1 to 9; and w is greater than or equal to 4.

11. The composition of claim 1, wherein the polyoxometalate has the formula $[YV_pZ_{12\text{-}p}O_{40}][A]$, wherein Y is phosphorus, silicon, or aluminum; Z is tungsten or molybdenum; p is from 1 to 6, and A is a counterion.

12. The composition of claim 1, wherein the metal nitrate is selected from the group consisting of iron (III) nitrate, cobalt (II) nitrate, nickel (II) nitrate, copper (II) nitrate, cerium (III) nitrate and cerium (IV) nitrate.

13. The composition of claim 1, wherein the metal nitrate is selected from the group consisting of iron (III) nitrate, cobalt (II) nitrate, nickel (II) nitrate, cerium (III) nitrate and cerium (IV) nitrate, and wherein the metal salt having weakly bound counter anions is selected from the group consisting of copper (II) perchlorate, copper (II) trifluoromethanesulfonate, and copper (II) tetrafluoroborate.

14. The composition of claim 1, wherein the polyoxometalate is selected from the group consisting of $TBA_6Fe_3PW_9O_{37}$, wherein TBA is tetra-n-butylammonium; $TBA_6V_{10}O_{28}$, $TBA_5PV_2Mo_{10}O_{40}$; $TBA_9Fe_3(A\text{-}PW_9O_{34})_2$; and $TBA_{12}Fe(OH_2)_2Fe_2(P_2W_{15}O_{56})_2$.

15. The composition of claim 1, wherein the composition is includedin a material.

16. The composition of claim 1, wherein the composition is includedin a material.

17. The composition of claim 15, wherein the material being selected from the group consisting of a fabric, a topical carrier, a powder, and a coating.

18. The composition of claim 16, wherein the material being selected from the group consisting of a fabric, a topical carrier, a powder, and a coating.

19. A method of removing a contaminant, comprising:

contacting the composition of claim 1 with the contaminant.

20. The method of claim 19, wherein the composition is included in a material.

21. The method of claim 20, wherein the material being selected from the group consisting of a fabric, a topical carrier, a powder, and a coating.

22. A method of removing a contaminant, comprising:

contacting the composition of claim 1 with the contaminant.

23. The method of claim 22, wherein the composition is included in a material.

24. The method of claim 23, wherein the material being selected from the group consisting of a fabric, a topical carrier, a powder, and a coating.

25. The composition of claim 1, wherein the metal nitrate is iron (III) nitrate.

26. The composition of claim 1, wherein the metal nitrate is cobalt (II) nitrate.

27. The composition of claim 1, wherein the metal nitrate is nickel (II) nitrate.

28. The composition of claim 1, wherein the metal nitrate is cerium (III) nitrate and cerium (IV) nitrate.

* * * * *